Jan. 14, 1964   W. ALBERT   3,117,369
VEHICLE WHEEL

Filed June 3, 1960   2 Sheets-Sheet 1

Inventor
Werner Albert
By his attorneys

Howson and Howson

Jan. 14, 1964     W. ALBERT     3,117,369
VEHICLE WHEEL

Filed June 3, 1960     2 Sheets-Sheet 2 section A-B

Inventor
Werner Albert
By his attorneys

Howson and Howson

United States Patent Office 3,117,369
Patented Jan. 14, 1964

3,117,369
VEHICLE WHEEL
Werner Albert, Solingen-Ohligs, Germany, assignor to Kronprinz Aktiengesellschaft, Solingen-Ohligs, Germany, a German company
Filed June 3, 1960, Ser. No. 33,743
Claims priority, application Germany June 6, 1959
2 Claims. (Cl. 29—159.01)

The invention relates to a vehicle wheel, e.g. for automobiles, comprising a rim of wheel and a concave wheel disc or wheel dish, both being formed of a thin sheet metal and rigidly connected with one another.

Connecting by rivet joints is known prior art, which however has certain drawbacks. In particular when tubeless pneumatic tires are mounted on the wheel, there is a danger of loss of air at such rivet joints.

In accordance with the present invention these drawbacks of known embodiments are avoided and a joint which is free from any objection is provided by both spot welding the rim and wheel dish and by form-closed interlocking portions which are formed by cold deformation.

In the preferred embodiment of the present invention interlocking portions are provided within the range or zone of the spot welding and are formed by cold deformation following the spot welding. This has the advantage that the physical properties in the welding areas which have been deleteriously affected in the locations of weld will be improved due to the cold deformation.

The deformation of the welded portions in the locations of weld can be taken up in different manner, e.g. by a simple compression or stamping operation. However, it is more appropriate to produce cup-like or annular recesses in the locations of weld effecting a reciprocal locking of the welded portions and unloading the spots of weld from stresses occurring during the operation.

In the second embodiment of the present invention the location of weld is spaced apart from the portions interlocking form-closed due to the cold deformation.

Figure 1:
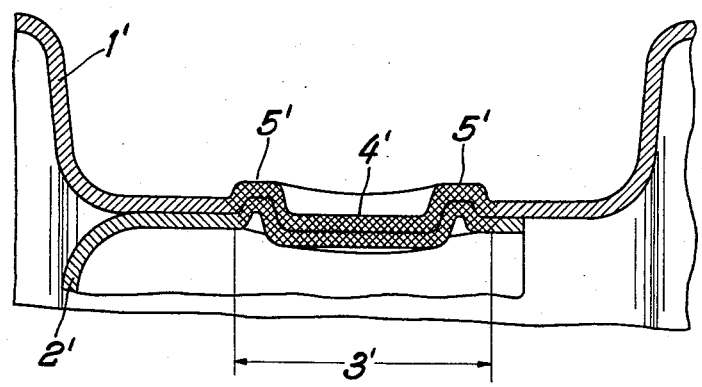

The drawings represent both these embodiments in accordance with the present invention by 3 figures, namely:

FIGURE 1 showing a sectional view of the first embodiment, whereas the

Figure 2:
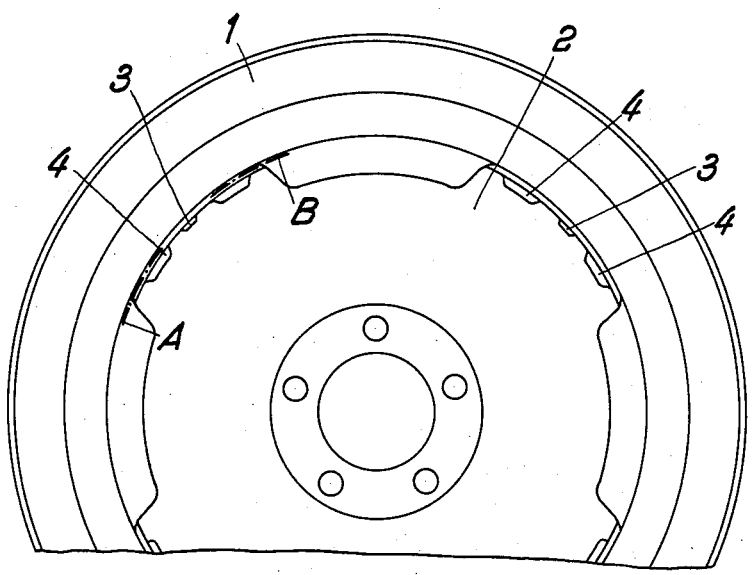
Figure 3:
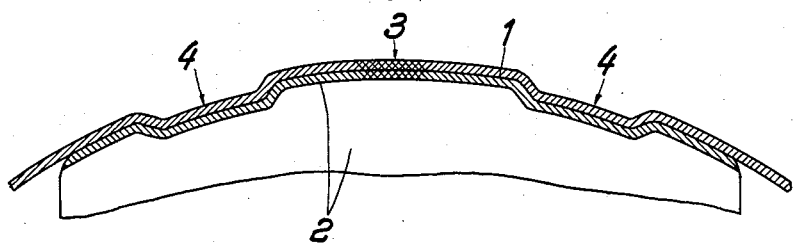

FIGURES 2 and 3 show the second embodiment, viz. FIGURE 2 being a lateral view and FIGURE 3 a section on the line A—B of FIGURE 2.

As to be inferred from FIGURE 1 the wheel dish 2' with its cylindrical edge portion is provided in the hollow cylindrical bottom portion of the rim 1'. The rim 1' and the wheel dish 2' are at first joined together by spot welding. The magnitude of the location of weld is indicated by 3' and by crosshatching. Within the area of this spot welding zone a cup-like recess 4' and an annular elevation 5' are produced by cold deformation, so that the connection of both portions in the sense of the present invention is not effected by weld only but also by form-closed interlocking of the parts concerned.

In the case of the second embodiment, as to be inferred in particular from FIGURE 3, the rim 1 is connected with the wheel dish on the one hand by spot weld 3, and on the other hand by cup-like recesses 4 provided beside the locations of the spot weld.

What is claimed is:

1. The method of forming a wheel of the type having a thin sheet metal rim portion and a central disc portion in which the rim portion has a cylindrical part and the disc portion has a cylindrical part within and abutting the interior surface of said cylindrical rim part, comprising spot-welding said cylindrical parts, and subsequently interlocking said rim and disc portions within the area of the weld by cold deformation.

2. The method of forming a wheel of the type having a thin sheet metal rim portion and a central disc portion in which the rim portion has a cylindrical part and the disc portion has a cylindrical part within and abutting the interior surface of said cylindrical rim part, comprising spot-welding said cylindrical parts, and interlocking said rim and disc portions within the area of the weld by creating a cup-like or annular deformation of the one into the other by cold deformation after the welding operation.

References Cited in the file of this patent

UNITED STATES PATENTS

| 1,365,896 | Duffy | Jan. 18, 1921 |
| 1,703,037 | Heck | Feb. 19, 1929 |
| 2,057,565 | Ekesergian | Oct. 13, 1936 |
| 2,751,675 | Bieber | June 26, 1956 |
| 2,830,168 | Taylor | Apr. 8, 1958 |
| 2,992,857 | Lemmerz | July 18, 1961 |

FOREIGN PATENTS

| 1,131,508 | France | Oct. 22, 1956 |